United States Patent Office 3,510,402
Patented May 5, 1970

3,510,402
NONDISCRIMINATING PROTEINASE AND THE PRODUCTION THEREOF
William E. Marshall, Fort Snelling, Minn., assignor to The Regents of the University of Minnesota, Minneapolis, Minn., a corporation of Minnesota
Filed Jan. 24, 1966, Ser. No. 522,710
Int. Cl. C12d 11/00; C07g 7/02
U.S. Cl. 195—62                     5 Claims

ABSTRACT OF THE DISCLOSURE

A new proteolytic enzyme having extremely broad substrate specificity and great hydrolytic activity against peptide bonds, and method of producing and isolating same from culture broth of Pencillium notatum.

---

The present invention relates to a new proteinase of Penicillium notatum having an extremely strong hydrolytic action against all tested proteins, both simple and complex, both native and denatured.

The activity of proteinases is most often measured in terms of their specificity for certain peptide bonds. For example, trypsin and chymotrypsin have high specificity, that is they will hydrolyze peptide bonds adjacent to certain amino acids. Other proteinases, for example, the proteinase of Streptomyces griseus is broad-acting, that is, has a broad specificity being able to attack many peptide bonds. Most proteinases fall between these two extremes. However, many proteinases, including the Streptomyces griseus proteinase, are unable to significantly hydrolyze complex proteins. This is true especially regarding those proteins which contain a high percentage of covalently bonded carbohydrates, for example, the alpha-1 acid glycoprotein of human serum. Furthermore, the Streptomyces griseus proteinase, as most other proteolytic enzymes, requires that its substrate, the protein, be in an unfolded or denatured state.

An object of the present invention is to provide the above-mentioned proteinase as a partially purified enzyme preparation, to provide that this preparation has great hydrolytic activity against most if not all peptide bonds neither requiring that a substrate, the protein, be in an unfolded or denatured state, or that its substrate be a simple protein rather than a complex protein, e.g., a glycoprotein. The Penicillium notatum proteinase is able to hydrolyze both simple and complex proteins, both in the native and denatured states to a far greater extent than heretofore demonstrated by a proteinase.

In the accompanying drawings appended to facilitate a better understanding of the invention:

FIG. 1 illustrates the proteolytic activity of Penicillium notatum proteinase when tested against human serum albumin and more particularly the relationship between pH and enzyme activity;

FIG. 2 illustrates a comparison between the proteolytic activity of Penicillium notatum proteinase and Streptomyces griseus Pronase when tested against alpha-1 acid glycoprotein of human serum; and FIG. 3 and 4 illustrates two purification procedures with measurements of proteolytic activity of Penicillium notatum proteinase made to determine the approximate molecular weight of the enzyme.

Production

The microorganism used in the method of production of proteinase according to this invention are selected from those belonging to Penicillium notatum. For the purpose of production, it is generally preferable to use liquid culture media. The proteinase is elaborated in both surface and submerged cultures by Penicillium notatum.

As the assimilable carbon sources, one or more of glucose, dextran, soluble starch, lactose, maltose, sucrose, etc., in various organic compounds, such as organic ammonium salts, organic nitrate, urea, amino acids, corn steep liquor, peptone, casein, meat extracts, or soy products, etc., may be used not only as a carbon source but also as digestible nitrogen source. In addition, mineral salts, phosphates, vitamins or growth factors may desirably be used for the culture media as accessory nutrients.

The initial pH of the culture media is adjusted to between pH 4 and 8. Of preference has been the Czapek-Dox media in submerged cultures at pH 7.0. The temperature of fermentation is between about 20 and 30° C. The duration of the growth is from about 2 to 7 days. The inoculum consists of spores of Penicillium notatum. Between the 3rd and 6th day, high titers of a proteolytic nature are found in the culture media.

Purification

The culture broth is filtered through gauze pads under vacuum or atmospheric pressure. The clear filtrate is then saturated with ammonium sulfate in order to precipitate protein. Any one or several of a large number of protein precipitating agents can be substituted for ammonium sulfate, such as organic solvents and other salting-out agents. The saturated filtrate is then allowed to stand for several days before centrifuging or filtering through paper and recovery of the protein precipitate. Residual ammonium sulfate can best be removed from this preparation by de-salting by means of dialysis or through columns of dextran sulfate (Sephadex or similar molecular sieves). The fractions which contained proteolytic activity can then be lyophilized. This preparation as such can be used as an industrial proteinase, however, there is some cellulytic activity present. If less than sautrated ammonium sulfate conditions are employed, cellulase will not be present.

The following examples set forth preferred methods of the present invention. They are intended to be solely illustrative and not at all limitative of the invention.

EXAMPLE 1

Spores of Penicillium notatum were used to inoculate wort broth pH 4.5 in surface cultures in roux bottles. On the 3rd day, proteolytic activity was found to be at a maximum as determined by testing a sample of the culture against a substrate at pH 4. The preferred and standardized technique of proteolytic assay was as follows: to 0.8 ml. of a solution containing 10 mg. of human serum albumin per ml. of $\frac{1}{10}$ molar sodium acetate buffer pH 4 was added 0.2 ml. of the test solution or culture broth. $\frac{1}{10}$ ml. was withdrawn immediately and frozen. The remaining $\frac{9}{10}$ ml. were incubated at 37° C. for 4 hours. At the end of the 4th hour, another $\frac{1}{10}$ ml. sample was withdrawn. The zero hour sample was thawed and to each sample was added 1 ml. of a ninhydrin reagent (Colowick, S. D. and N. O. Kaplan, Methods in Enzymology, vol. III, p. 468, Academic Press, New York, 1957). The ninhydrin solutions were then boiled for 20 min., allowed to cool and 5 ml. of an alcohol-water 50–50 mixture was added as diluent. After 20 min. the absorbance at 570 millimicrons was measured in a suitable colorimeter. The difference in the absorbance at 570 millimicrons between the 4-hour and the 0-hour sample represented proteolytic activity. Ninhydrin is known to react with free amine groups, formed in this case by hydrolysis of a peptide bond. The contents of the roux bottles were mixed and filtered through gauze pads by vacuum or atmospheric filtration. To the clear filtrate was added 0.2 molar hydrochloric acid until the pH was 3.7. The solution was then saturated with ammonium sulfate and allowed to stand for several days at room temperature, or at 4° C. The precipitate thus formed was recovered either by centrifugation or by filtration through paper. The precipitate so recovered was redissolved in a minimum amount of buffer, preferably with a pH between 5 and 7. Traces of ammonium sulfate could then be removed by subjecting the solution to gel filtration in columns equilibrated with a volatile solvent. The fractions which contain proteolytic activity could then be pooled and lyophilized. This material can then be used as an industrial proteinase, however, there are traces of cellulase activity still present. Cellulase can be avoided by using less than saturated ammonium sulfate as stated above. Further purification can be achieved by any of the usual methods of purification, e.g., ion exchange chromatography, gel filtration, electrophoresis, etc. Further purification was carried out by zone electrophoresis on columns of cellulose at a pH of 6.0. Under these conditions, proteolytic activity can be well separated from cellulase activity. The proteinase resulting from electrophoresis is highly purified and free of all enzymatic activity of a carbohydrase nature.

EXAMPLE 2

Spores of *Penicillium notatum* were used to inoculate 10 liter fermentation tanks of Czapek-Dox media pH 7.0. With agitation and with the temperature maintained at 25°, after about 4 days proteolytic titer is high. The culture is then filtrated through gauze pads and treated with ammonium sulfate as described in Example 1. The desalted, lyophilized prepaartion of *Penicillium notatum* proteinase can then be further purified by passage through an ion exchange column, DEAE Sephadex (A–25). A typical example of this chromatography is as follows: The material containing the proteinase was chromatographed on a DEAE Sephadex (A–25) column with a total volume of about 2 liters. The column had been previously equilibrated with 1/10 molar pyridine-acetic acid buffer pH 5.0. The material that is eluted with this buffer has very low cellulase activity and contains high proteolytic activity. This material can then be used for proteolytic hydrolysis with minimum cellulytic activity. (Sephadex is a dextran sulfate manufactured by Pharmacia A.B., Uppsala, Sweden. Its use is briefly summarized in Colowick, S. D. and N. O. Kaplan, Methods in Enzymology, vol. V, p. 13, Academic Press, New York 1962.)

Further purification can be obtained by passage of the proteolytic material through Sephadex G–75 as shown in FIG. 3 or Sephadex G–100 as shown in FIG. 4.

Proteinase Properties

The proteolytic sample used to determine pH optima is that resulting from the initial ammonium sulfate precipitation of the culture broth. FIG. 1 provides the pH optima data using serum albumin as a substrate in concentrations of 1% at 37° C. The absorbance of ninhydrin color is that absorbance of the difference between the reading after 4 hours and at zero time. The optimum activity, as seen in FIG. 1, lies between pH 3.4 and 4.2.

FIG. 2 presents data illustrating the broad hydrolytic activity of the proteinase of the present invention against the alpha-1 acid glycoprotein of human serum. This glycoprotein containing about 40% carbohydrate existing as about a dozen carbohydrate side chains is known to be particularly resistant to proteolytic hydrolysis. In FIG. 2, a gel filtration of the digestion medium after the action of the *Penicillium notatum* proteinase on this glycoprotein is compared with a separation of the digestion between this glycoprotein and *Streptomyces griseus* proteinase. The *Streptomyces griseus* proteinase is considered one of the most broad-acting proteinases commercially available. One can see in FIG. 2 that the action of the *Penicillium notatum* proteinase hydrolyzes this glycoprotein in its native state to the peptide or amino acid level. The material of peptide nature eluting between 82–100 ml. is actually a small peptide joined to a large carbohydrate. The action of *Streptomyces griseus* proteinase on this glycoprotein is marked by a large peak at 65 ml. and a smaller peak appears at 44 ml. This suggests that the protein has not been digested to any great extent. Similar results have been found between the *Penicillium notatum* enzyme and human serum transferrin, human serum macroglobulin, human serum gamma globulin, casein, ribonuclease, bovine serum albumin, and human serum ceruloplasm. Some activity was found against collagen and wheat gluten, considerable activity against soybean proteins. The material that was dissolved was hydrolyzed to the peptide level. About 25% of the insoluble protein, wheat gluten was converted to a soluble state. The *Penicillium notatum* proteinase had no detectable activity against bacitracin, a cyclic peptide. A sample of mixture of all human serum blood proteins was treated with the *Penicillium notatum* proteinase. Hydrolysis to the peptide and amino acid stage occurred.

It has been determined that there is no off-flavor resulting from the action of the proteinase on either casein or human albumin.

An indication of the isoelectric point of the proteinase was obtained by zone electrophoresis on columns of cellulose. This shows the isoelectric point to fall between pH 5 and 6.

From the relative position of proteolytic activity as shown in FIGS. 3 and 4, the molecular weight of the proteinase can be determined with some degree of accuracy. It is thus determined that the proteinase has a molecular weight of between about 15,000 and 30,000.

*Penicillium notatum* proteinase can be lyophilized or air dried without appreciable loss of activity. Samples have been stored in solution at pH 5.7 at 4° C. for periods of one year and in the dry state for 3 years without appreciable loss of activity.

Figure 1:
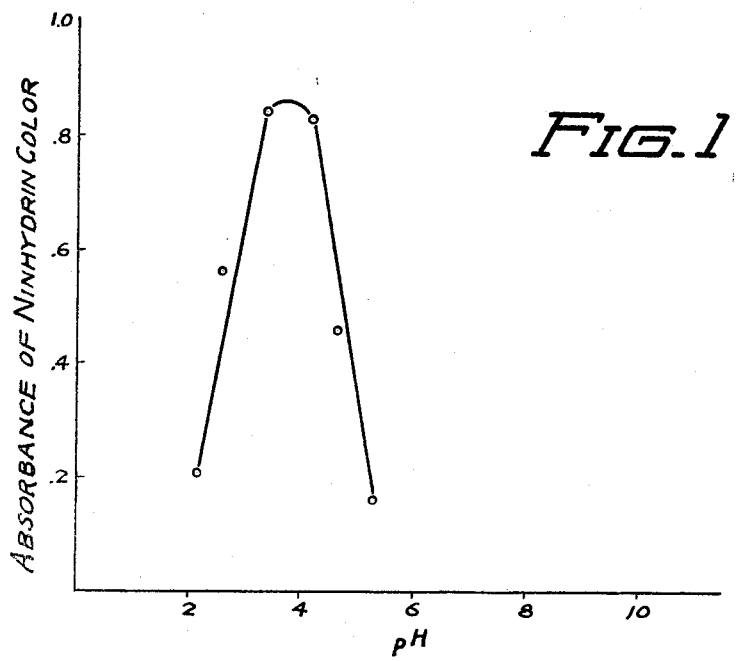
FIGURE 1
Figure 2:
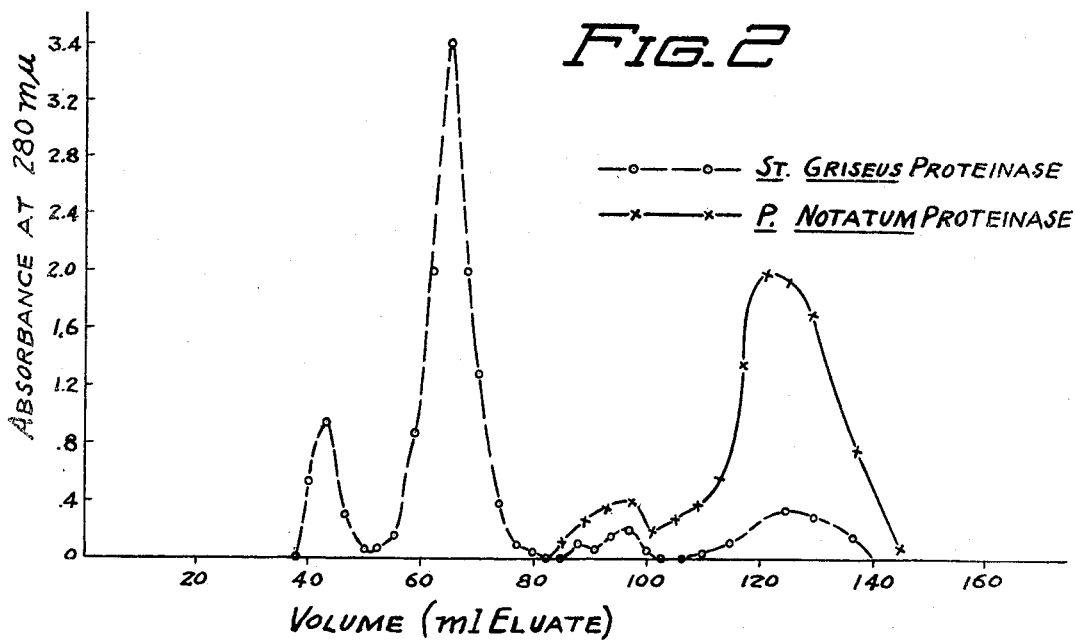
Figure 3:
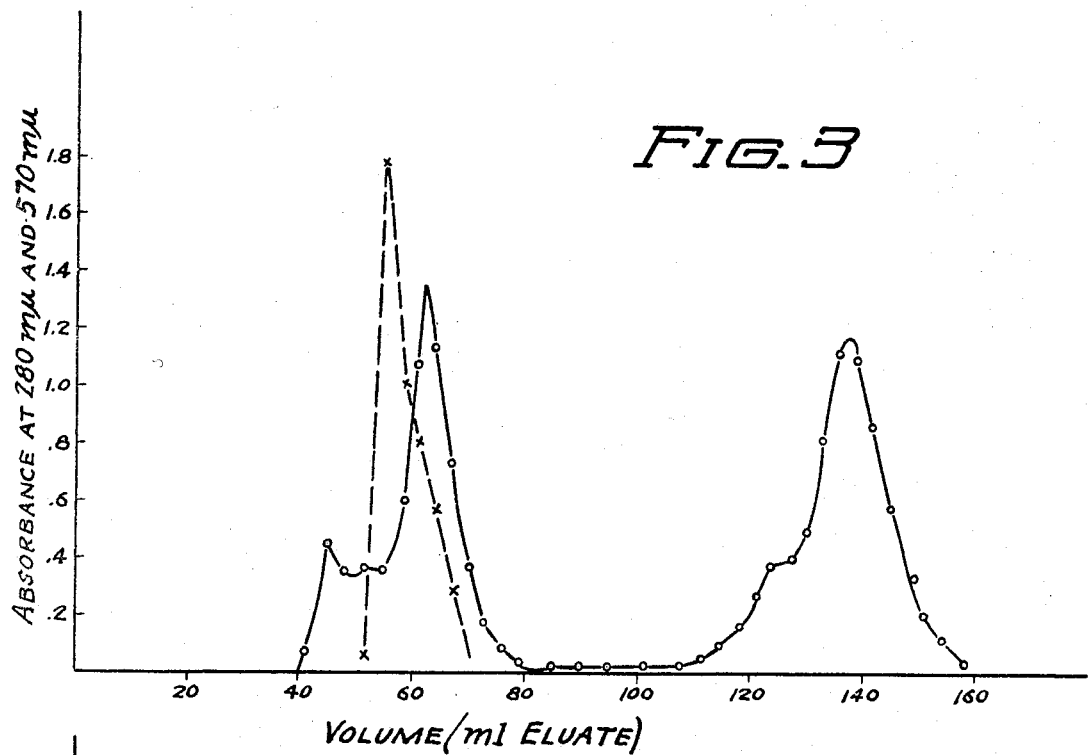
Figure 4:
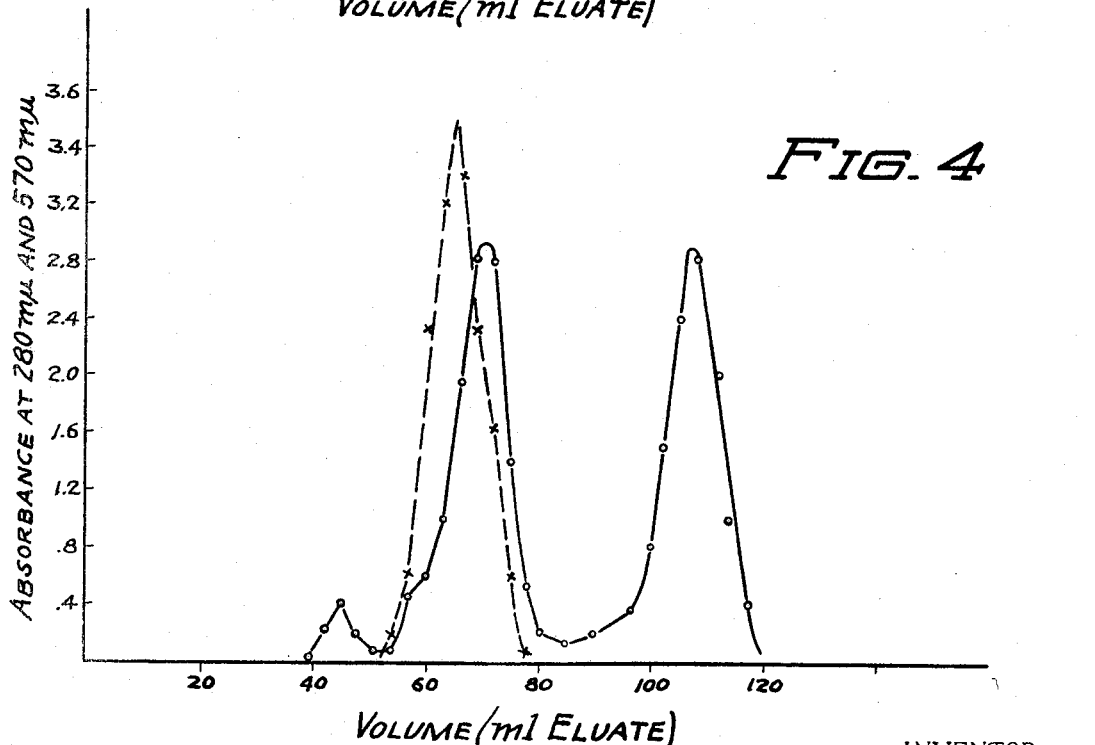

A 0.2 ml. sample of a preparation of the *Penicillium notatum* proteinase was mixed with 0.8 ml. of a solution of 1% human serum albumin in buffers of 0.1 M from pH 2.0 to 9.0 and allowed to stand at 37° C. At zero time 0.1 ml. was withdrawn and frozen; after 4 hours a second 0.1 ml. was withdrawn. 1 ml. of ninhydrin reagent was added (Colowick, S. D. and N. O. Kaplan, Methods in Enzymology, vol. III, p. 468, Academic Press Inc., New York, 1957). The difference in absorbance at 570 millimicrons after 4 hours of incubation due to the appearance of free amine groups was used as a measure of proteolytic activity.

FIGURE 2

Two identical samples of the alpha-1 acid glycoprotein of human serum (a protein particularly resistant to proteolysis) were incubated individually with preparations of *Streptomyces griseus* Pronase and the *Penicillium notatum* proteinase at a substance to enzyme ratio of about 50:1 at 37° C. for 65 hours; protein concentration, about 2.5%. The solutions were then individually applied to a column of Sephadex G–100 (44 x 2.2 cm.) equilibrated with 0.2 M acetic acid and having a void volume of 40 ml. and a total volume of 130 ml. Proteins having a molecular weight of 35,000 or higher appear between 40 and 50 ml. of eluate. Peptides and amino acids appear at 115 to 140 ml. of eluate. As can be seen, proteolysis was far greater in the case of the *Penicillium notatum* proteinase than *Streptomyces griseus* Pronase.

FIGURE 3

A crude culture preparation of *Penicillium notatum* proteinase was subjected to gel filtration on Sephadex G–75 (46 x 2.2 cm.) equilibrated with 0.2 M acetic acid having a void volume of 45 ml. and a total volume of 140 ml. As can be seen, proteolytic activity appears at about 55 ml. (as represented by x—x) indicating a molecular weight of 30,000 or less.

FIGURE 4

A crude culture preparation of *Penicillium notatum* proteinase was subjected to gel filtration on Sephadex G–100 (46 x 2.2 cm.) equilibrated with pyridine-acetic acid pH 4.5, having a void volume of 45 ml. and a total volume of 140 ml. As can be seen, proteolytic activity appears at about 65 ml. indicating a molecular weight of between 15,000 and 30,000.

UTILITY

Broad specificity proteinases are useful for many industrial and scientific purposes. Among these may be mentioned the following:

(1) Use for scientific research in elucidating protein structure and eliminating unnecessary proteinaceous impurities from animal and plant tissue. The *Penicillium notatum* proteinase appears to possess greater activity (by actual comparisons) against proteins than *Streptomyces griseus* Pronase. This difference can be expected to be most pronounced regarding the more complex proteins (e.g. those of animal and plant tissue). The pH optimum range of the *Penicillium notatum* proteinase is 3.4 to 4.2. The range of *Streptomyces griseus* Pronase is pH 6 to 9. They therefore complement each other in the pH range of 3 to 9. The use of *Penicillium notatum* proteinase in the study of the structure of glycoproteins is illustrated by the paper of applicant and another appearing in The Journal of Biological Chemistry, vol. 240, No. 1, January 1965, pp. 209–217.

(2) Use for manufacturing amino acids. Since the *Penicillium notatum* proteinase is capable of hydrolyzing proteins to the peptide or amino acid level, it may be used in the production of these amino acids. An enzymic method is superior to acid hydrolysis since those amino acids destroyed by acid can be recovered unaltered.

(3) Use for improving the quality of wheat flour. The *Penicillium notatum* proteinase can be useful for improving the taste of wheat flour and increasing its nutritive value by partially digesting gluten into peptides and amino acids. This technique is especially effective in treating flour which contains a high percentage of gluten.

(4) Use as a meat tenderizer. The *Penicillium notatum* proteinase can be useful as a meat tenderizer by its ability to readily hydrolyze animal tissue. The proteinase itself adds to the nutritive value of the meat. No off-flavor results from the action of *Penicillium notatum* proteinase on casein or albumin.

(5) Use for cheese manufacture. Application of *Penicillium notatum* proteinase for cheese manufacture can be effective in reducing the time of ripening and altering the viscosity of spreads.

(6) Use for manufacturing fish soluble. The preparation of a concentrated digestible liquid resulting from proteolysis of fresh fish can be achieved with *Penicillium notatum* proteinase.

(7) Use for manufacturing bacterial medium. The digestion products of proteins produced by *Penicillium notatum* proteinase can be utilized as a bacterial medium of quality.

Other suggested uses include use for manufacturing eutrophics, condiments, etc., such as meat juice, meat soup or bouillon; use for educing substances from tissues; use for improving the qualities of food and drink; use as digestive; use in beauty aids such as cold cream, lotions, soap, dental cream, etc.; use for deliming reagent (bating reagent) in leather manufacture; medical uses in lotions and ointments; for desizing glue from cloth to promote uniform dyeing; for removing gelatin coating and silver compound from film without demaging the base; for manufacturing starch paste from wheat flour; for skinning fish and for removing certain spots in dry cleaning.

The proteolytic hydrolysis of vegetable proteins is illustrated by the following examples:

(1) A sample of soybean protein was treated with *Penicillium notatum* proteinase at 37° C. for 5 days at pH 4.0 resulting in a decrease in the molecular weight of all protein from about 300,000 to less than 30,000. About half of the sample had a molecular weight of 10,000 or less after hydrolysis.

(2) A preparation of wheat gluten—a sticky, gummy insoluble protein—was treated for 9 days at 37° C. at pH 4.0. After treatment about 75% of the gluten was still insoluble but exhibiting little if any of its inherent viscous nature. The 25% which was soluble showed a molecular weight of 30,000 or less; the majority, 10,000 or less.

This invention is based at least in part upon work done under a contract or grant from the United States Government.

I claim:

1. A method of producing a proteolytic enzyme possessing the following properties: (a) molecular weight between about 15,000 and 30,000; (b) optimum pH for the enzyme activity between about 3.4 and 4.2; (c) substrate specificity: extremely broad; and (d) great hydrolytic activity against peptide bonds of both simple and complex proteins both in the native and denatured states; which method comprises: incubating *Penicillium notatum* in an aqueous medium containing assimilable carbon sources, digestible nitrogen sources and other nutrients for the growth of the micro-organism at an initial pH between 4 and 8 and a temperature between about 20 and 30° C. under aerobic conditions for about 2 to 7 days until the proteinase is substantially accumulated in the culture broth, and recovering the accumulated proteinase from the liquid part of the culture broth.

2. A method according to claim 1 further characterized in that said proteinase is recovered from the culture broth by first filtering the culture broth, treating the filtrate with a protein precipitating agent and separating the precipitated protein.

3. A method according to claim 1 further characterized in that the incubation takes place in Czapek-Dox media in submerged cultures at about pH 7.0.

4. A method according to claim 1 further characterized in that the proteinase is precipitated by filtering the culture broth, treating the filtrate with ammonium sulfate, separating the precipitate and removing residual ammonium sulfate by de-salting through dextran sulfate.

5. A non-discriminating proteolytic enzyme of *Penicillium notatum* possessing the following properties:
(a) molecular weight between about 15,000 and 30,000;
(b) optimum pH for the enzyme activity between about 3.4 and 4.2;
(c) water-soluble;
(d) air-driable without appreciable loss of activity;
(e) lyophilizable without appreciable loss of activity;
(f) isoelectric point between about pH 5 and 6;
(g) substrate specificity: extremely broad;
(h) great hydrolytic activity against peptide bonds of both simple and complex proteins both in the native and denatured states;
(i) the ability to produce free amino acid by reacting the proteinase with proteinaceous material to cause enzymatic digestion of said material and the production of free amino acids;
(j) the ability to elucidate protein structure by reacting the proteinase with complex proteinaceous material to hydrolyze the proteins and eliminate unnecessary proteinaceous impurities; and
(k) the ability to hydrolyze heretofore resistant native glycoproteins selected from the group consisting of blood globulins, soy proteins and soluble collagen.

References Cited

UNITED STATES PATENTS

| | | | |
|---|---|---|---|
| 2,926,122 | 2/1960 | Goldsmith et al. | 195—66 |
| 2,940,904 | 6/1960 | Ohlmeyer | 195—66 |
| 3,063,911 | 4/1961 | Tanaka et al. | 195—62 |
| 3,127,327 | 3/1964 | Nomoto et al. | 195—62 |
| 3,269,918 | 8/1966 | Barton | 195—66 |
| 3,331,751 | 7/1967 | Reusser | 195—62 |

LIONEL M. SHAPIRO, Primary Examiner

U.S. Cl. X.R.

195—66

PO-1050
(5/69)

UNITED STATES PATENT OFFICE
CERTIFICATE OF CORRECTION

Patent No. 3,510,402              Dated May 5, 1970

Inventor(s)     William E. Marshall

It is certified that error appears in the above-identified patent and that said Letters Patent are hereby corrected as shown below:

Column 1, line 4, "Fort Snelling, Minn." should be --Mt. Kisco, New York--

Column 3, line 31, "prepaartion" should be --preparation--.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents